(12) United States Patent
Arnholt, Jr. et al.

(10) Patent No.: US 7,937,512 B1
(45) Date of Patent: May 3, 2011

(54) METHOD AND APPARATUS FOR AN AUTOMATIC RECOVERY KEYBOARD FOR SLATE TABLET COMPUTERS

(75) Inventors: William Arnholt, Jr., Portage, MI (US); Charles E. Kinkade, Jr., Warren, MI (US)

(73) Assignee: SPX Corporation, Charlotte, NC (US)

( * ) Notice: Subject to any disclaimer, the term of this patent is extended or adjusted under 35 U.S.C. 154(b) by 6 days.

(21) Appl. No.: 12/581,389

(22) Filed: Oct. 19, 2009

(51) Int. Cl.
*G06F 3/02* (2006.01)

(52) U.S. Cl. ............................................. 710/72; 710/63

(58) Field of Classification Search .................. None
See application file for complete search history.

(56) References Cited

U.S. PATENT DOCUMENTS

| | | | |
|---|---|---|---|
| 5,822,582 A * | 10/1998 | Doragh et al. ................... 713/2 |
| 5,854,905 A * | 12/1998 | Garney .......................... 710/104 |
| 6,167,532 A * | 12/2000 | Wisecup ......................... 714/23 |
| 6,553,432 B1 * | 4/2003 | Critz et al. ...................... 710/10 |
| 7,234,054 B2 * | 6/2007 | Rothman et al. ................... 713/2 |
| 7,447,888 B2 * | 11/2008 | Du et al. ............................. 713/1 |
| 7,451,304 B2 * | 11/2008 | Chang et al. ....................... 713/2 |
| 7,631,112 B2 * | 12/2009 | Heo et al. ......................... 710/16 |
| 7,634,600 B2 * | 12/2009 | Nishida ............................. 710/72 |
| 7,793,091 B2 * | 9/2010 | Weikel, Jr. ....................... 713/100 |
| 2006/0069543 A1 * | 3/2006 | Sajwani et al. ................. 703/24 |
| 2006/0225067 A1 * | 10/2006 | Yang ............................... 717/168 |
| 2006/0253639 A1 * | 11/2006 | Lee et al. ......................... 710/313 |
| 2007/0027668 A1 * | 2/2007 | Chen ................................ 703/13 |
| 2007/0288227 A1 * | 12/2007 | Kim et al. ........................ 703/24 |
| 2008/0262825 A1 * | 10/2008 | Haid et al. ....................... 703/23 |
| 2008/0300054 A1 * | 12/2008 | Munshi ............................ 463/37 |

* cited by examiner

*Primary Examiner* — Cheng-Yuan Tseng
(74) *Attorney, Agent, or Firm* — Baker & Hostetler LLP

(57) ABSTRACT

A method and apparatus for reimaging of a computing device are provided. The apparatus may include a recovery device which connects to a computing device via a communication network or a connector. The recovery device may have the capability to retrieve data from and to transfer data to the computing device to simulate inputs of an input device. Sometimes the simulated inputs are in response to a prompt from the computing device for an input response. The recovery device may reimage software applications, operating systems, and data to replace and/or fix corrupted or damaged portions of information stored on a memory of the computing device without the need for other input devices.

23 Claims, 3 Drawing Sheets

METHOD AND APPARATUS FOR AN AUTOMATIC RECOVERY KEYBOARD FOR SLATE TABLET COMPUTERS

FIELD OF THE INVENTION

The present invention relates generally to the recovery of computing devices due to damage or corruption, for example, by viruses, bad data transfers, writing errors, improper shutdowns, etc. resulting in the need to reimage software and/or data. More particularly, the present invention relates to the re-imaging of slate tablet computers in a manner not requiring the use of a certain peripheral devices such as, for example, a keyboard or an external DVD-ROM device.

BACKGROUND OF THE INVENTION

Computing device failures are a common occurrence. On some occasions such failures cause critical harm to the software running or stored on the computing device. The damage or corruption of the software will cause programs running on the computing device to malfunction, resulting in programs not functioning in the way intended or even at all. When the damage or corruption of software occurs, a common way to correct the problem is to reimage or reinstall the software. In some instances, reimaging a particular software module or software program may be sufficient to fix the issue. This solution is most common with software that is nonessential to the general function of the computing device.

When essential software or multiple software programs fail, because of damage or corruption, more often the solution is to reimage the entire program, or even reimage the entire drive where the program is stored. When reimaging a drive, the drive may be wiped clean, resulting in the loss of all information on the drive.

In any of the above cases, whether it is necessary to reimage just a software module or the entire drive, the software failure or the reimaging process may disable certain abilities of the computing device, or the reimaging process may require certain interaction with the computing device. Examples of these issues include disabled input devices or required use of an input device. In some instances, the disabled input device may hinder reimaging, and in other cases where the required use of an input device may not be feasible if the input device is not available.

It is desirable to provide a method and apparatus for an automatic recovery keyboard for reimaging of software without the use of certain peripheral devices.

SUMMARY OF THE INVENTION

At least in view of the above, it would be desirable to provide a method and apparatus for an automatic recovery keyboard for reimaging of software without the use of a certain peripheral devices.

The foregoing needs are met, to a great extent, by certain embodiments of the present invention. According to one such embodiment of the present invention, a recovery device for reimaging a computing device is provided which can comprise a memory having at least one stored set of instructions for reimaging at least part of the contents of a computing device memory, a processor communicatively linked to the memory, and configured to access the memory, retrieve the instructions for reimaging and execute the instructions to reimage the computing device memory, and a connector configured to communicatively link the processor and the computing device.

According to another embodiment of the present invention, a method for reimaging a computing device using a recovery device, which can comprising the steps of simulating a first input from an input device to enter the computing device's BIOS menu, simulating at least a second input from the input device to access the system boot options in the BIOS menu, simulating at least a third input from the input device to designate the recovery device as a preferred boot device, simulating at least a fourth input from the input device to exit the BIOS menu, and reimaging a memory of the computing device.

According to yet another embodiment of the present invention, a system for reimaging a computing device is provided which can comprise a means for storing at least one set of instructions for reimaging at least part of the contents of a computing device memory, a means for accessing the means for storing, retrieving the instructions for reimaging, and executing the instructions to reimage the computing device memory, a means for simulating inputs from an input device, and a means for communicatively connecting the system to a computing device.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An embodiment of the present inventive method and apparatus for an automatic recovery keyboard for reimaging of software may provide an apparatus for simulating the use of or replacing certain required peripherals for recovery by reimaging software ("recovery device"). The recovery device may be employed to reimage an entire memory of a computing device, an operating system, individual software and software modules, and data stored on the computing device's memory.

The recovery device may include a processor to simulate inputs of a peripheral input device so as to eliminate the need for the input device. An example of an input device that may not be needed when the recovery device is used is a keyboard. The processor of the recovery device may send signals to the computing device simulating a keystroke from a keyboard. The computing device may then interpret the signal as a keystroke or series of keystrokes from a keyboard and respond accordingly. It is contemplated that other input devices may be simulated as well.

A memory may be included in the recovery device. The memory of the recovery device may serve a couple purposes. Firstly, this memory may store instructions necessary to execute the recovery of the computing device. Such instructions may include which input signals to simulate and when to simulate them. The memory of the recovery device may also be used to provide the software and or data used to reimage the computing device. For example, the memory of the recovery device may contain the code for software applications or operating systems that need to be reimaged, or it may contain copies of data that were stored on the computing device.

A further feature of the recovery device may be to have a selection means, such as, for example, one or more DIP (dual in-line package) switches, to select options for reimaging the computing device. The one or more selection means may be arranged in different ways to represent and effect different options. Such options may include, for example, selecting the content with which to reimage the computing device, or the type of computing device to be reimaged.

The recovery device may also be either a separate device from the computing device, or it may be integral to the computing device. If the recovery device is a separate device, then it may likely have a housing of its own and a connector, such as, for example, a USB (universal serial bus) connector, to put the recovery device in communication with the computing device. The recovery device may even resemble a USB flash drive. If the recovery device is integral to the computing device, then it may be contained within the housing of the computing device and connected to a common bus with the other components of the computing device.

Figure 1:
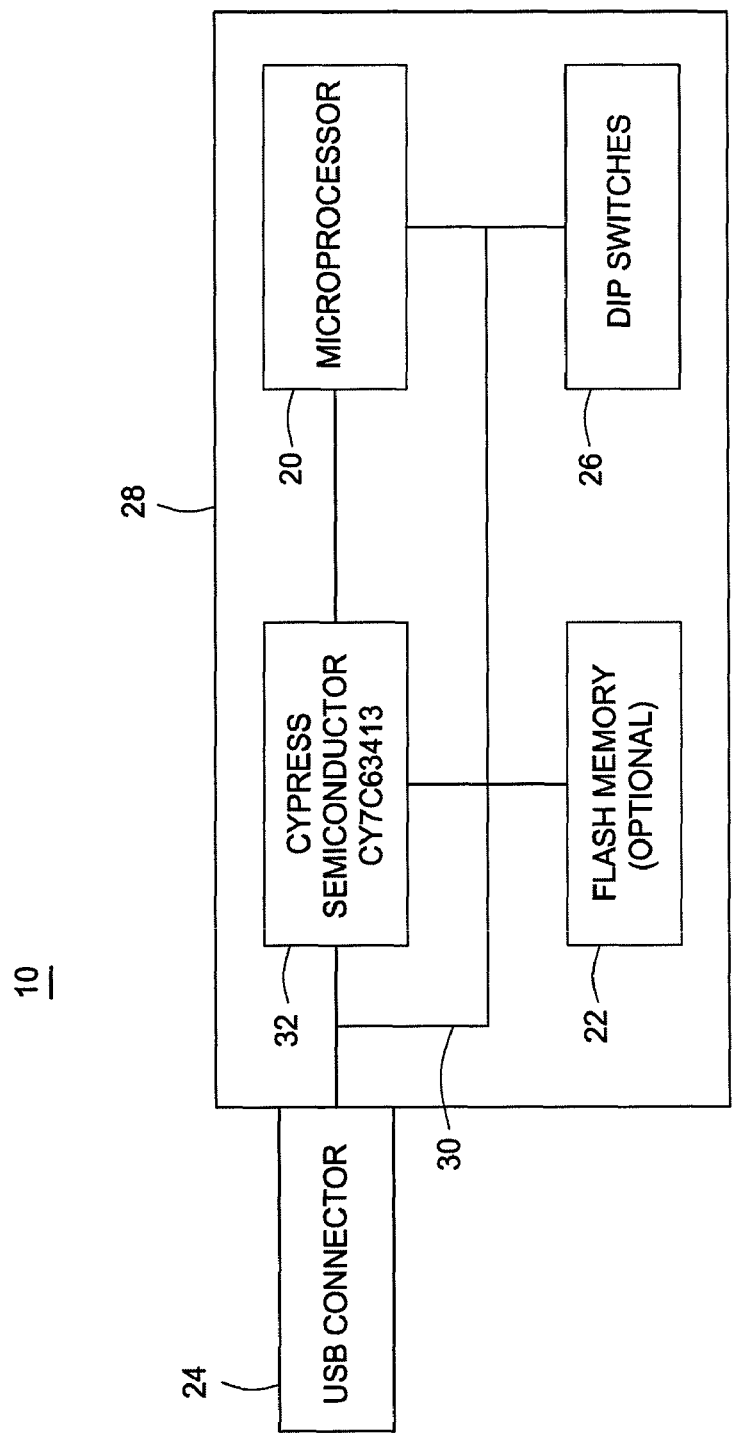
FIG. 1 is a schematic view of a recovery device for reimaging of a computing device according to an embodiment of the present invention.

The invention will now be described with reference to the drawing figures, in which like reference numerals refer to like parts throughout. FIG. 1 is a schematic diagram illustrating the recovery device 10 according to an embodiment of the present invention.

The recovery device 10 may include a processor 20, a memory 22, a connector 24, a selecting device 26, and a housing 28. The electronic components of the recovery device 10 may be interconnected by a datalink 30. It is further contemplated that the recovery device 10 may be integral to a computing device (not shown), and therefore may share some of these components with the computing device. Some such shared components may include, for example, the processor 20, the housing 28, the datalink 30.

The recovery device 10 may be a preprogrammed device, having been built with a predetermined purpose. A preprogrammed recovery device 10 may be suitable for use with only specific types of computing devices because it was only built for use with those computing devices. The programmed recovery device 10 in such an instance may only have limited sets of instructions that allow for reimaging of predetermined kinds of computing devices with certain software. The preprogrammed recovery device 10 may be configured to work with only one type of computing device, or multiple predetermined computing devices.

Conversely, the recovery device 10 may be programmable, allowing for modification of the function of the recovery device, such as to adapt the recovery device 10 for use with multiple computing devices with varying software configurations. The programmable recovery device 10 may also allow for storage of data from a computing device, much like a backup, so that the stored data may be reimaged if necessary.

Depending on the configuration of the recovery device 10, be it preprogrammed or programmable, different types of processors 20 may be suitable for use in the recovery device 10. Thus, the processor 20 of the recovery device 10 may be, for example, an FPGA, a CLPD, a PLA, a microprocessor, or a combination thereof.

The processor 20 may have the ability to sense a voltage or a current being provided to the recovery device 10 from the computing device via the connector 24, for example, a USB connector. Alternatively, a sensor (not shown) may be employed to sense the voltage or the current and send a signal to the processor 20 to indicate that the recovery device 10 is receiving power.

Similarly, the configuration for the recovery device 10, be it preprogrammed or programmable, may affect the choice of memory 22 used in the recovery device 10. Other factors may also affect the choice of memory 22 type for use in the recovery device, such as whether the recovery device 10 is a unit unto itself or if it is integrated into a computing device, and the size of what is stored it the memory. Thus, the memory 22 of the recovery device 10 may be, for example, optical, magnetic, solid state, read only, or rewritable.

The configuration of the recovery device 10 may also dictate the type of connector 24 employed, if at all. In some instances, for example, if the recovery device 10 were external to a computing device, the connector 24 maybe of the type connectable to a serial port, a parallel port, or both. The connector 24 may include on or more of USB, Micro-USB, FireWire™, Ethernet, etc.

A multitude of hardware interface devices 32 may be employed such that the processor 20 may interface with the connector 24. In one embodiment of the recovery device 10, using USB for the connector 24, the interface device 24 allows for the processor to send and receive data through the USB connector. In such an instance, one option is that the interface device 32 is a Cypress® semiconductor, part number CY7C63413.

Figure 2A:
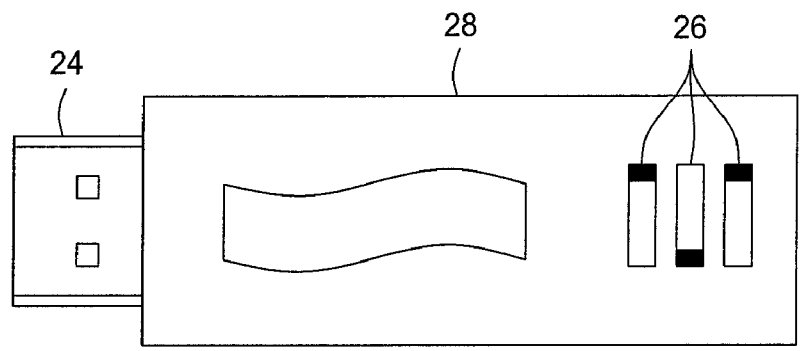
FIG. 2a is a top view of a recovery device for reimaging of a computing device according to an embodiment of the present invention.
Figure 2B:
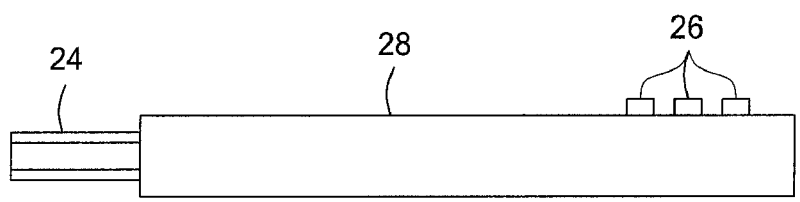
FIG. 2b is a side view of a recovery device for reimaging of a computing device according to an embodiment of the present invention.

Now referring to FIGS. 2a and 2b, one embodiment of the recovery device 10 may have the housing 28 enclosing the majority of the components of the recovery device 10. Still some of the components of the recovery device may extend through the housing 28. For example, the connector 24 extends beyond the bounds of the housing 28 so that the connector may be inserted into a port of the computing device. In another embodiment, the connector 24 may be retractable when not in use. There exist other possible constructions of the recovery device such that the connector 24 may not extend beyond the bounds of the housing 28. The connector 24 may be a group of electrical contacts that are flush with or even recessed beneath the surface of the housing, like in, for example, and SD memory card or an Ethernet plug. In such an embodiment, the port in the computing device would have electrical contacts arranged to meet with the electrical contacts of the connector 24.

Also shown in the figures as extending beyond the housing is the selecting device 26. The selecting device 26 allows for the selection of options for reimaging the computing device. Such options may include, but are not limited to, selecting the appropriate reimaging process for the specific computing device, selecting certain software to be reimaged, selecting a certain operating system to be reimaged, and selecting data to be reimaged. The options may also include selecting the correct reimaging software, for example, selecting Ghost by Symantec™ Software, or Recover Pro by Phoenix Software. The selecting device 26 may allow for the selection of one or multiple options for reimaging the computing device. There are different ways to implement the selecting device 26. In one embodiment, the selecting device 26 may be on or more DIP switches, each of which may turn on or off a single option, or the combination of DIP switch settings may be interpreted to signify a combination of options. The selecting device 26 may also be implemented by, for example, buttons, slide bars, knobs, or touch sensitive inputs.

The computing device previously mentioned (not shown) may include an input device, a memory, a communication device, a processor, and a display, all of which can be interconnected by a data link. The computing device may be a general computer, such as a personal computer (PC), a UNIX workstation, a server, a mainframe computer, a personal digital assistant (PDA), a cellular phone, a smart phone, or some combination of these. Alternatively, the computing device may be a specialized computing device, such as a vehicle diagnostic scan tool or a vehicle communication interface. An example of the computing device may be a slate tablet computer, generally one that does not have physical keyboard. Such slate tablet computers may be manufactured by, for example, Panasonic®, Motion Computing™, Tablet-Kiosk™, Getac™, Fujitsu®, DT Research™, or Itronics™. Another example of a computing device may be the AGCO™ Electronic Diagnostic Tool. The remaining components can include programming code, such as source code, object code or executable code, stored on a computer-readable medium that can be loaded into the memory and processed by the processor in order to perform desired functions.

In various embodiments, the computing device and the connector 24 may be coupled to a communication network (not shown). The communication network allows for communication between the computing device and the connector 24, which allows information to pass between the computing device and the recovery device 10.

The computing device can be coupled to the communication network by way of the communication device, which in various embodiments can incorporate any combination of devices—as well as any associated software or firmware— configured to couple processor-based systems. Such communication devices may include modems, network interface cards, serial buses, parallel buses, LAN or WAN interfaces, wired, wireless or optical interfaces, and the like, along with any associated transmission protocols, as may be desired or required by the design. Various embodiments of the communication network may include any viable combination of devices and systems capable of linking computer-based systems, such as USB; Bluetooth™; Wi-Fi; the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; a combination of any number of distributed processing networks or systems or the like.

Additionally, an embodiment of the computing device can communicate information to the user through the display and request user input through the input device by way of an interactive, menu-driven, visual display-based user interface, or graphical user interface (GUI). As described above, the recovery device 10 may respond to these requests for user input through simulating input device signals of input devices such as, for example, a pointing device, such as a mouse or a stylus, keys, buttons, a trackball, a scroll wheel, a touch sensitive pad, a touch screen, or a voice-activated system to select from a variety of selectable fields, including selectable menus, drop-down menus, tabs, buttons, bullets, checkboxes, text boxes, and the like.

The memory may include, for example, any form or combination of volatile, solid state, magnetic, optical, permanent, removable, writable, rewriteable, and read-only memory. The memory may contain a number of instructions for use with the computing device. The memory of the computing device may also be the memory 22 of the recovery device 10. In the case where the memory of the computing device and the recovery device 10 is shared, there may be a partitioned section of the memory to store the instructions, software, and data for use with the recovery device.

Figure 3:
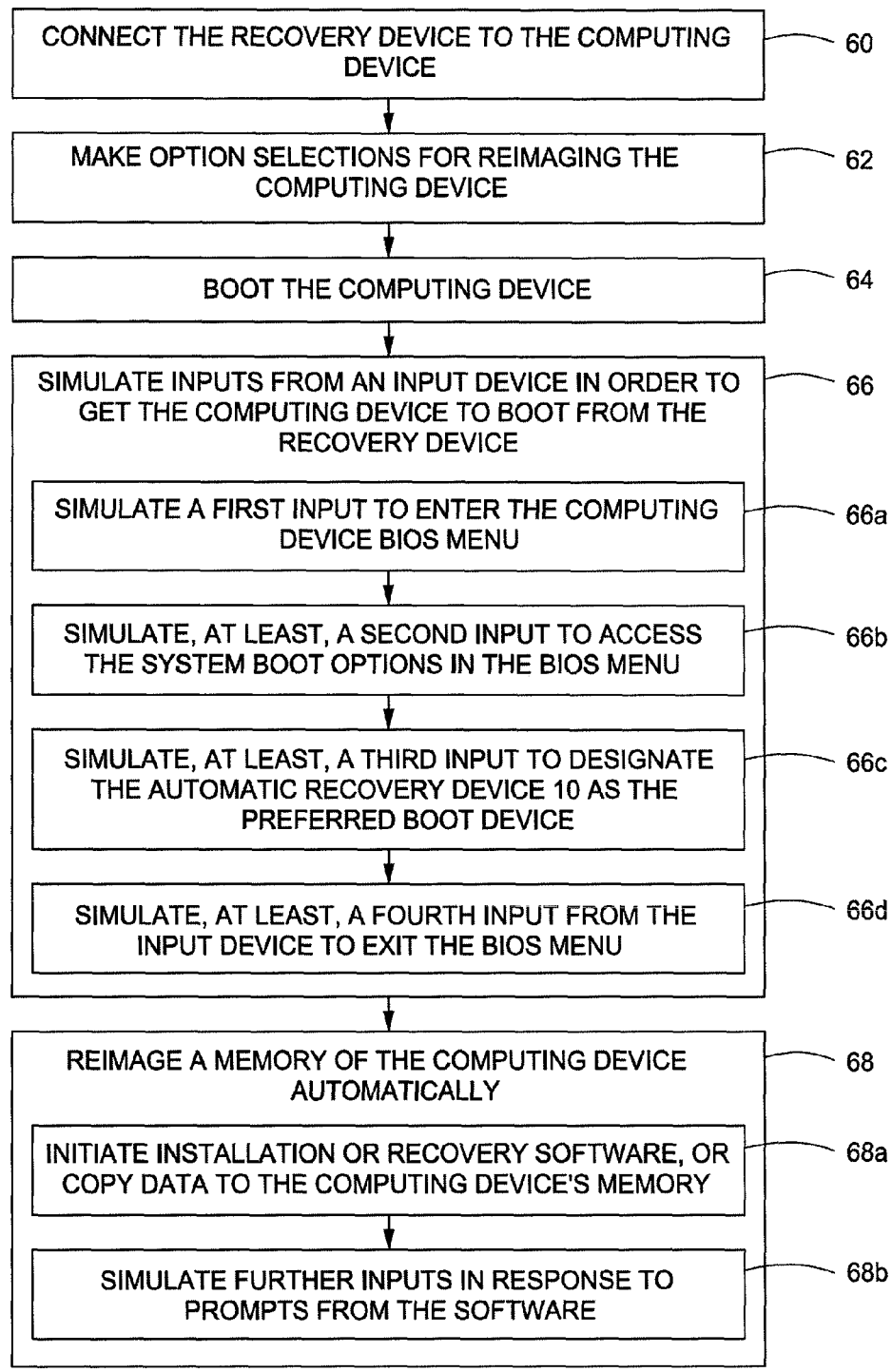
FIG. 3 is a flow diagram of a method for reimaging of a computing device using a recovery device according to an embodiment of the present invention.

Referring now to FIG. 3, illustrated is a flow diagram of a method for reimaging a computing device using the recovery device 50 according to an embodiment of the present invention. Any or all of the following steps to reimage the computing device may be initiated manually or occur automatically. Initially, if the recovery device 10 is a separate device from the computing device, one may have to connect the recovery device 10 to the computing device prior to booting the computing device (step 60). Also prior to booting the computing device, one may choose to make option selections for reimaging the computing device by setting the selecting device 26 (step 62). Setting the selecting device 26 may include, but is not limited to, setting options for selecting the appropriate reimaging process for the specific computing device, selecting certain software to be reimaged, selecting a certain operating system to be reimaged, selecting data to be reimaged, and selecting the correct reimaging software. Selecting the reimaging options may optionally occur before connecting the recovery device to the computing device when the two devices are separate. Following connecting the recovery device (step 60), if necessary, and making option selections for reimaging the computing device (step 62), the computing device should be booted (step 64).

When the computing device begins to boot, the recovery device may sense that it is receiving power from the computing device and the recovery device begins to simulate inputs from an input device in order to get the computing device to boot from the recovery device (step 66). The simulated inputs and the timing for which they should be simulated may vary depending on a number of factors. The recovery device 10 may hold for predetermined amounts of time prior to each simulating step to ensure that the simulating step is executed when the computing device is ready to accept the simulated input. The predetermined amounts of time may differ for the individual simulating steps. Thus, the following is simply an exemplary embodiment of implementing step 66, and it should be understood that the number, type, and timing of the simulated inputs may be designed for any application. In executing step 66, the recovery device 10 may simulate a first input from an input device to enter the computing device BIOS menu (step 66a). Then, the recovery device 10 may simulate, at least, a second input from the input device to access the system boot options in the BIOS menu (step 66b), and simulate, at least, a third input from the input device to designate the recovery device 10 as the preferred boot device (step 66c). Once, the recovery device 10 is set as the preferred boot device, it may simulate, at least, a fourth input from the input device to exit the BIOS menu (step 66d).

Once step 66 is complete, the recovery device 10 may reimage a memory of the computing device (step 68). As before, any inputs simulated by the recovery device 10 may be generated in varying types, numbers, and at varying time intervals depending on the application of the recovery device 10. To reimage the computing device, the recovery device may initiate installation or recovery software, or copy data to the computing device's memory (step 68a). Once, any software has been initiated and is running, the recovery device 10 may be required to simulate further inputs in response to prompts from the software (step 68b).

FIGS. 1-3 are diagrams and flowcharts of methods and systems according to various embodiments of the present invention. It will be understood that the steps of the flowchart illustration, and combinations of steps in the flowchart illustration, can be implemented by computer program instructions or other means. Although computer program instructions are discussed, an apparatus according to the present invention can include other means, such as hardware or some combination of hardware and software, including one or more processors or controllers, for performing the disclosed functions.

Typically, computer program instructions, such as portions of the instructions for reimaging a computing device, may be loaded onto the computer or other general purpose programmable machine, such as the recovery device 10, to produce a specialized machine, such that the instructions that execute on the computer or other programmable machine create means for implementing the functions specified in the flowchart. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the flowchart.

In addition, the computer program instructions may be loaded into a computing device or other programmable machine, such as the recovery device 10, to cause a series of operational steps to be performed by the computing device or other programmable machine to produce a computer-implemented process, such that the instructions that execute on the computer or other programmable machine provide steps for implementing the functions specified in the flowchart steps.

Accordingly, steps of the flowchart support combinations of means for performing the specified functions, combinations of steps for performing the specified functions and program instruction means for performing the specified functions. It will also be understood that each step of the flowchart, as well as combinations of steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A recovery device for reimaging a computing device, comprising:
    a memory having at least one stored set of instructions for reimaging at least part of the stored contents of a computing device memory;
    a processor communicatively linked to the memory, and configured to access the memory, retrieve the at least one stored set of instructions for reimaging and execute the at least one stored set of instructions to reimage the computing device memory, wherein the at least one stored set of instructions include the steps of:
        simulating a first input from an input device to enter the computing device's BIOS (Basic Input/Output System) menu;
        simulating a second input from the input device to access system boot options in the computing device's BIOS menu;
        simulating a third input from the input device to designate the recovery device as a preferred boot device;
        simulating a fourth in input from the in input device to exit the computing device's BIOS menu; and
        reimaging the computing memory; and
    a connector to communicatively link the processor and the computing device.

2. The recovery device of claim 1, further comprising at least one selecting device to set an option for the reimaging of the computing device.

3. The recovery device of claim 2, wherein the option for the reimaging of the computing device is selected from a group consisting of reimaging a select software, reimaging an operating system, reimaging a stored data, the type of computing device to be reimaged, and the software used to reimage the computing device.

4. The recovery device of claim 1, further comprising a housing enclosing at least the memory and the processor.

5. The recovery device of claim 4, further comprising a DIP switch configured to set an option of the reimaging of the computing device, wherein the DIP switch protrudes through the housing.

6. The recovery device of claim 4, wherein the connector protrudes through the housing.

7. The recovery device of claim 1, wherein the connector is a USB connector.

8. The recovery device of claim 1, further comprising a semiconductor communicatively connected to the connector and the processor.

9. The recovery device of claim 1, wherein the memory, the processor and the connector of the recovery device are integral to the computing device.

10. The recovery device of claim 9, further comprising a DIP switch configured to set an option of the reimaging of the computing device, wherein the DIP switch protrudes through a computing device housing.

11. The recovery device of claim 1, wherein the recovery device is configured to automatically reimage the computing device.

12. A method for reimaging a computing device using a recovery device, comprising the steps of:

retrieving at least one set of instructions for reimaging at least part of stored contents of a computing device memory from a recovery device memory;

executing the retrieved at least one set of instructions with a recovery device processor;

simulating a first input from an input device to enter the computing device's BIOS (Basic Input/Output System) menu with the recovery device processor;

simulating a second input from the input device to access the system boot options in the computing device's BIOS menu with the recovery device processor;

simulating a third input from the input device to designate the recovery device as a preferred boot device with the recovery device processor;

simulating a fourth input from the input device to exit the computing device's BIOS menu with the recovery device processor; and reimaging the computing device memory via a connector communicatively linked between the recovery device processor and the computing device.

13. The method of claim 12, further comprising the step of communicatively attaching the recovery device to the computing device prior to booting the computing device.

14. The method of claim 12, further comprising the step of selecting an option to designate what to reimage on the computing device memory.

15. The method of claim 14, wherein the selecting the option is selected from a group consisting of reimaging a select software, reimaging an operating system, reimaging a stored data, the type of computing device to be reimaged, and the software used to reimage the computing device.

16. The method of claim 12, further comprising the step of holding for a predetermined amount of time prior to each simulating step to ensure that the each respective simulating step is executed only when the computing device is ready to accept the corresponding first, second, third or fourth simulated input.

17. The method of claim 16, wherein the predetermined amount of time differs for each individual simulating steps.

18. The method of claim 12, further comprising a step of simulating a plurality of inputs from the input device to execute a computing device reimaging program.

19. The method of claim 12, wherein the first, second, third, and fourth simulated inputs from the input device represent keystrokes from a keyboard.

20. The method of claim 12, wherein reimaging the memory of the computing device occurs automatically.

21. A system for reimaging a computing device, comprising:

a non-transitory means for storing at least one set of instructions for reimaging at least part of stored contents of a computing device memory;

a means for accessing the at least one set of instructions for reimaging from the non-transitory means for storing, and executing the at least one set of instructions to reimage the computing device memory, wherein at least one set of instructions include the steps of:

simulating a first input from an input device to enter the computing device's BIOS (Basic Input/Output System) menu;

simulating a second input from the input device to access system boot options in the computing device's BIOS menu;

simulating a third input from the input device to designate the recovery device as a preferred boot device;

simulating a fourth input from the input device to exit the computing device's BIOS menu; and reimaging the computing device memory; and a means for communicatively connecting the system to the computing device.

22. The system of claim 21, further comprising a means for selecting an option to designate what to reimage on the computing device memory, wherein the option is selected from a group consisting of reimaging a select software, reimaging an operating system, reimaging a stored data, and the type of computing device to be reimaged.

23. The system of claim 21, wherein the system is configured to automatically reimage the computing device.

* * * * *